United States Patent [19]

Eicken et al.

[11] Patent Number: 5,512,614
[45] Date of Patent: Apr. 30, 1996

[54] BINDER MIXTURES FOR STOVING LACQUERS

[75] Inventors: Ulrich Eicken, Korschenbroich; Herbert Fischer, Duesseldorf; Wolfgang Gress, Wuppertal; Ulrich Nagorny, Hilden; Norbert Stork, Duesseldorf, all of Germany

[73] Assignee: Henkel Kommanditgesellschaft auf Aktien, Duesseldorf, Germany

[21] Appl. No.: 381,899

[22] Filed: Aug. 5, 1993

[86] PCT No.: PCT/EP93/02079

§ 371 Date: Feb. 13, 1995

§ 102(e) Date: Feb. 13, 1995

[87] PCT Pub. No.: WO 94/04621

PCT Pub. Date: Mar. 3, 1994

[30] Foreign Application Priority Data

Aug. 13, 1992 [DE] Germany .......................... 42 26 805.2

[51] Int. Cl.$^6$ ...................... C09D 167/08; C09D 179/02
[52] U.S. Cl. .......................... 523/501; 523/503; 524/539; 524/599; 524/600; 524/601; 524/602; 524/606; 524/604; 524/607; 524/608; 525/38; 525/42; 525/43; 525/44; 525/47; 525/403; 525/405; 525/411; 528/423
[58] Field of Search ................................ 523/501, 503; 524/539, 599, 600, 601, 602, 608, 606, 607; 525/38, 42, 43, 44, 47, 403, 405, 411; 528/423

[56] References Cited

U.S. PATENT DOCUMENTS

| | | | |
|---|---|---|---|
| 3,458,456 | 7/1969 | Levy et al. | 260/2 |
| 5,130,440 | 7/1992 | Krause et al. | 548/239 |
| 5,233,020 | 8/1993 | Hase et al. | 528/423 |
| 5,344,859 | 9/1994 | Eicken et al. | 523/501 |

FOREIGN PATENT DOCUMENTS

| | | |
|---|---|---|
| 0000144 | 1/1979 | European Pat. Off. . |
| 0113800 | 7/1984 | European Pat. Off. . |
| 0113799 | 7/1984 | European Pat. Off. . |
| 0126404 | 11/1984 | European Pat. Off. . |
| 1206585 | 1/1964 | Germany . |
| 1495031 | 1/1969 | Germany . |
| 1904540 | 1/1970 | Germany . |
| 1570213 | 1/1970 | Germany . |
| 1595278 | 12/1970 | Germany . |
| 2727824 | 1/1978 | Germany . |
| 3824982 | 5/1989 | Germany . |
| 3900859 | 7/1990 | Germany . |
| 3914155 | 10/1990 | Germany . |
| 3914133 | 10/1990 | Germany . |
| 3932375 | 10/1990 | Germany . |
| 3943111 | 7/1991 | Germany . |
| 9109918 | 7/1991 | WIPO . |

OTHER PUBLICATIONS

A. Levy and M. Litt, J. Polym. Sci. Al, 6, 1883 (1968).
S. Kobayashi and T. Saegusa in Ring–opening Polymerization, vol. 2, Ed. J. Irvin, T. Saegusa, London, 1984, p. 761.
Encyclopedia of Polymer Science and Technology, vol. 1, 1st Edition, 1976, pp. 679 to 705.

*Primary Examiner*—Frederick Krass
*Attorney, Agent, or Firm*—Ernest G. Szoke; Wayne C. Jaeschke; Henry E. Millson, Jr.

[57] ABSTRACT

A binder mixture for stoving lacquers comprising A) at least one alkyd resin; and B) at least one poly-N-acyl alkyleneimine prepared by cationic polymerization of a monomer mixture of a) from 10 to 90% by weight of at least one monomer corresponding to formula (I):

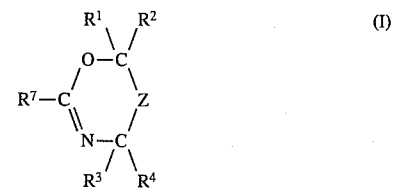

in which Z is a direct bond or the group $CR^5R^6$, $R^1$ to $R^4$ can be the same or different and represent H or a $C_{1-8}$ alkyl group, $R^5$ and $R^6$ can be the same or different and represent H or a $C_{1-2}$ alkyl group, $R^7$ is a hydroxyl-containing alkyl or alkylene group of a hydroxycarboxylic acid containing 2 to 32 carbon atoms, b) from 90 to 10% by weight of at least one monomer corresponding to formula (II):

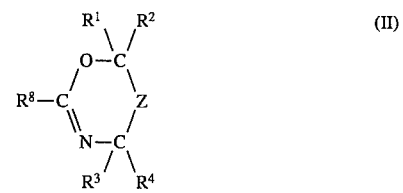

in which Z and $R^1$ to $R^6$ are as defined above and $R^8$ is the radical of an aromatic monocarboxylic acid, and c) from 0 to 80% by weight of at least one monomer corresponding to formula (III):

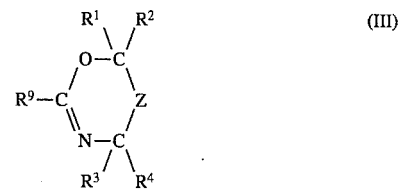

in which Z and $R^1$ to $R^6$ are as defined above, and $R^9$ represents a non-hydroxy-substituted aliphatic radical of a carboxylic acid. The invention also relates to stoving lacquers containing the above binder mixture.

18 Claims, No Drawings

BINDER MIXTURES FOR STOVING LACQUERS

Priority is claimed for German Application No. P 42 26 805.2, filed Aug. 13, 1992 and for PCT Application No. PCT/EP93/02079, filed Aug. 5, 1993.

BACKGROUND OF THE INVENTION

1. Field of the Invention

This invention relates generally to stoving lacquers and, more particularly, to new binder mixtures containing alkyd resins and hydroxyfunctional poly-N-acyl alkyleneimines, to a process for the production of these binder mixtures and to their use.

2. Statement of Related Art

Basically, lacquers are divided into physically drying systems and chemically drying systems. With chemically drying systems, a chemical reaction leading to crosslinking in the lacquer film takes place after application of the lacquer to the surface, resulting in a drastic reduction in the redissolvability of the hardened film in relation to the original lacquer ingredients.

One form of chemically drying lacquers are oxidatively drying systems where the crosslinking reaction is initiated with atmospheric oxygen. Another form of chemical drying is the curing of binders by crosslinking with crosslinking agents. One example of this second type of drying is the crosslinking of alkyd resins (binder) with melamine/formaldehyde condensates (cross-linking agent). Crosslinking can be initiated both by stoving at high temperatures (stoving lacquers) and by addition of acids (acid-curing lacquers).

Where alkyd resins are exclusively used as binders for stoving lacquers, film quality is often in need of improvement in regard to the hardness and corrosion resistance of the lacquer films. Attempts have been made to overcome these disadvantages by modifying the alkyd resins, for example with epoxides or isocyanates. Epoxy-modified alkyd resins tend to chalk. Isocyanate-modified alkyd resins produce lacquer films which tend to yellow.

DE-A-39 43 111 describes stoving lacquers containing hydroxyfunctional poly-N-acyl alkyleneimines as binders. For film formation, the hydroxyfunctional poly-N-acyl alkyleneimines are crosslinked with polyisocyanates or aminoplastics. The films formed all show acceptable hardness values, but only when crosslinking is carried out at high stoving temperatures (beyond 160° C.). However, high stoving temperatures always mean long reaction times and a considerable energy demand.

In the search for binders capable of leading to paints with hard glossy films characterized by improved resistance to corrosion, tests were carried out with mixtures of the hydroxyfunctional poly-N-acyl alkyleneimines known from DE-A-39 43 111 and alkyd resins. However, it was found that, with melamine resins as crosslinker, binder mixtures such as these lead only to hazy lacquer films. Accordingly, the mixtures in question are incompatible or only poorly compatible with melamine resins. Mixtures of the poly-N-acyl alkyleneimines known from DE 39 00 859, which do not contain any hydroxyl groups, and alkyd resins were also tested. These binder mixtures also led to hazy lacquer films with melamine resins.

DESCRIPTION OF THE INVENTION

Accordingly, the problem addressed by the present invention was to provide binder mixtures based on alkyd resins which would lead to harder and more corrosion-resistant lacquer films than pure alkyd resins without being attended by any of the disadvantages of hitherto known modified alkyd resins. Above all, these binder mixtures would also be compatible with the crosslinkers so that clear films would be obtained.

The problem stated above has surprisingly been solved by using poly-N-acyl alkyleneimines containing both hydroxyl groups and aromatic radicals together with alkyd resins as binder mixtures for stoving lacquers.

Accordingly, the present invention relates to binder mixtures for stoving lacquers containing A) alkyd resins and B) poly-N-acyl alkyleneimines prepared by cationic polymerization of a monomer mixture of 10 to 90% by weight of monomers corresponding to formula (I):

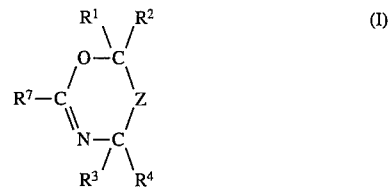

in which

Z is a direct bond or the group $CR^5R^6$, $R^1$ to $R^4$ may be the same or different and represent H or a $C_{1-8}$ alkyl group, $R^5$ and $R^6$ may be the same or different and represent H or a $C_{1-2}$ alkyl group, $R^7$ is a hydroxyl-containing alkyl or alkylene group of a hydroxycarboxylic acid containing 2 to 32 carbon atoms, and 90 to 10% by weight of monomers corresponding to formula (II):

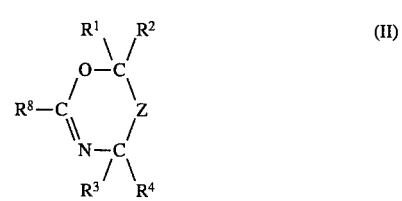

in which Z and $R^1$ to $R^5$ are as defined above and $R^8$ is the radical of an aromatic monocarboxylic acid and 0 to 80% by weight of monomers corresponding to formula (III):

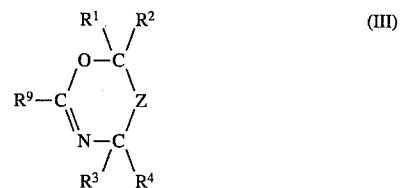

in which Z is a direct bond or the group $>CR^5R^6$, $R^1$ to $R^4$ may be the same or different and represent H or a $C_{1-8}$ alkyl group, $R^5$ and $R^6$ may be the same or different and represent H or a $C_{1-2}$ alkyl group and $R^9$ represents a non-hydroxy-substituted aliphatic radical of a carboxylic acid.

The poly-N-acyl alkyleneimines present as component B in accordance with the invention are prepared by cationic polymerization of the monomers corresponding to formulae I and II. Cationic polymerizations such as these are described in DE-A-12 06 585, DE-A-15 70 213, DE-A-19 04 540 or DE-A-39 00 859 and in US-A-3,458,456. The monomers corresponding to formulae (I) and (II) are cyclic iminoethers. Poly-N-acyl alkyleneimines prepared by polymerization of the monomers corresponding to formulae (I) and (II), in which Z is a direct bond and $R^1$ to $R^4$ represent hydrogen, are particularly preferred. Monomers such as these are generally known as oxazolines and may be obtained, for example, from the β-chloroethylamides or from the ethanolamides of the corresponding carboxylic acids or carboxylic acid mixtures by dehydrohalogenation or dehydration. Particulars of the production of the oxazolines can be found in A. Lewy and M. Litt, J. Polym. Sci. A1, 6, 1883 (1968); S. Kobayashi and T. Saegusa in Ring-Opening Polymerization, Vol. 2, Ed. J. Irvin, T. Saegusa, London, 1984, page 761 and in DE-A-38 24 982, DE-A-39 14 155 and DE-A-39 14 133.

The hydroxyfunctional oxazolines corresponding to formula (I) may be prepared from hydroxycarboxylic acids corresponding to the formula $R^7COOH$ or from esters of these hydroxycarboxylic acids. Examples of suitable hydroxycarboxylic acids are hydroxyacetic acid, 2-hydroxybutyric acid, 3-hydroxybutyric acid, 2-hydroxyhexanoic acid, 6-hydroxyhexanoic acid, 11-hydroxyundecanoic acid, 12-hydroxyoctadecanoic acid, 12-hydroxy-9c-octadecanoic acid (ricinoleic acid). If esters of these hydroxycarboxylic acids are used for the production of the oxazolines, it is preferred to employ esters of short-chain monohydric alcohols containing 1 to 4 carbon atoms.

However, the hydroxyfunctional oxazolines may also be produced by initially preparing unsubstituted oxazolines from unsubstituted $C_{2-32}$ monocarboxylic acids in known manner and subsequently reacting these unsubstituted oxazolines with formaldehyde, so that hydroxyl groups are introduced into the alkyl radical $R^7$. Particulars of these known reactions of unsubstituted oxazolines with formaldehyde can be found in EP-A-144 and in DE-A-27 27 824. Although this process variant leads to suitable oxazolines, the oxazolines are preferably produced from the hydroxycarboxylic acids.

From the group of hydroxyfunctional oxazolines, those in which $R^7$ in general formula (I) is the alkyl or alkylene radical of a $C_{4-22}$ hydroxycarboxylic acid, preferably the alkyl radical of hydroxyhexanoic or hydroxystearic acid and/or the alkylene radical of ricinoleic acid are preferred. Accordingly, preferred representatives of monomers corresponding to formula (I) are 2-(5-hydroxypentyl)-oxazoline, 2-(3-hydroxypentyl)-oxazoline, 2-(11-hydroxyheptadecyl)-oxazoline and/or 2-(11-hydroxy-9-heptadecenyl)-oxazoline. The hydroxypentyloxazolines and ricinoloxazoline are particularly preferred.

Monomers corresponding to formula (II) may be prepared similarly to the monomers corresponding to formula (I), except that aromatic monocarboxylic acids rather than hydroxycarboxylic acids are used as starting material. Suitable aromatic monocarboxylic acids are benzoic acid and alkyl derivatives thereof. Benzoic acid is particularly preferred, so that the preferred representative of monomers corresponding to formula (II) is 2-phenyl oxazoline.

The poly-N-acyl alkyleneimines present in the binder mixtures according to the invention are prepared from monomer mixtures which also contain optional monomers corresponding to formula (III) in addition to monomers corresponding to formulae (I) and (II).

Monomers corresponding to formula (III), in which Z is a direct bond and $R^1$ to $R^4$ are hydrogen, are preferred. Accordingly, the preferred representatives of monomers corresponding to formula (III) are also oxazolines. Similarly to the other monomers, they are prepared in known manner from β-chloroethylamides or from ethanolamides and the corresponding carboxylic acid. Corresponding carboxylic acids are both saturated and unsaturated carboxylic acids providing they do not contain any hydroxyl groups. Carboxylic acids containing 2 to 22 carbon atoms, such as butyric acid, valeric acid, caprylic acid, nonyl acid, lauryl acid, palmityl acid, stearyl acid, decyl acid and oleyl acid, are particularly preferred. Mixtures of the aliphatic carboxylic acids present in the form of their triglycerides in natural fats and oils may of course also be used. The monomers corresponding to formula (III) may be present in quantities of 0 to 80% by weight, based on monomer mixture, from which poly-N-acyl alkyleneimines are produced by cationic polymerization.

In a particularly preferred embodiment, the binder mixtures according to the invention contain poly-N-acyl alkyleneimines which have been produced by cationic polymerization from a monomer mixture containing 20 to 60% by weight of monomers corresponding to formula (I), in which Z is a direct bond and $R^1$ to $R^4$ are hydrogen, 40 to 60% by weight of monomers corresponding to formula (II), in which Z is a direct bond and $R^1$ to $R^4$ are hydrogen, 0 to 40% by weight of monomers corresponding to formula (III), in which Z is a direct bond, $R^1$ to $R^4$ are hydrogen and $R^9$ is the radical of a non-hydroxy-substituted aliphatic carboxylic acid preferably containing 2 to 22 carbon atoms.

Poly-N-acyl alkyleneimines which have been prepared from 20 to 60% by weight of ricinoloxazoline and/or hydroxypentyloxazolines, 40 to 60% by weight of phenyloxazoline and 0 to 40% by weight of monomers corresponding to general formula (III) with the preferred meanings for Z, $R^1$ to $R^4$ and $R^9$ are most particularly preferred.

The alkyd resins present in the binder mixtures according to the invention are the resins known per se for stoving lacquers which are produced by reaction of monocarboxylic acids, dicarboxylic acids or their anhydrides and polyols. Alkyd resins used for stoving lacquers still contain free hydroxyl groups so that they can be crosslinked with the crosslinking agents to form the lacquer. In general, the hydroxyl value according to DIN 53240 is in the range from 20 to 200 and preferably in the range from 50 to 150. A review of suitable starting materials and production methods for alkyd resins can be found, for example, in Encyclopedia of Polymer Science and Technology, Vol. 1, 1st Edition, 1976, pages 679 to 705. The alkyd resins described therein are suitable for storing lacquers containing only organic solvents. For water-containing stoving lacquers, it is advisable to use alkyd resins in which polyethylene glycol is incorporated and/or of which the residual acid groups have been at least partly neutralized. EP-A-113 799, EP-A-113 800 and EP-A-126 404, for example, describe alkyd resins for water-containing stoving lacquers of which the residual acid groups have been neutralized by aminoalcohols. In the context of the invention, the expression "water-containing" storing lacquers encompasses both lacquers containing only water as solvent and lacquers containing water in admixture with known organic solvents as the solvent component. One particularly preferred embodiment of the present invention is characterized by the use of alkyd resins of which the residual acid groups have been at least partly neutralized and which contain co-condensed polyethylene glycol. These preferred alkyd resins are described, for example, in DE-A-39 32 375, in DE-A-14 95 031 and in DE-B-15 95 278. In these preferred alkyd resins for water-containing on stoving lacquers, preferably from 50 to 100% of the residual acid groups of the alkyd resins have been neutralized, preferably with volatile amines and/or ammonia. Polyethylene glycol is preferably co-condensed in quantities of 0.1 to 15% by weight, based on the alkyd-resin-forming reaction mixture. According to DE-A-39 32 375, alkyd resins particularly suitable for water-containing stoving lacquers have been produced from 20 to 40% by weight of polyhydric alcohols, more particularly trimethylol propane and pentaerythritol, 20 to 45% by weight of fatty acids or fatty acid mixtures containing 8 to 22 carbon atoms, the fatty acids preferably being partly unsaturated, 10 to 25% by weight of aromatic monobasic carboxylic acids, more particularly benzoic acid and/or alkyl derivatives thereof substituted at the ring, 20 to 35% by weight of dicarboxylic acids and/or anhydrides thereof, particularly phthalic acid and/or its anhydride, 0.1 to 15% by weight of polyethylene glycol with an average molecular weight of 600 to 6,000, each component based on alkyd-resin-forming reaction mixture.

Alkyd resins which have been produced from unsaturated fatty acids, such as lauroleic acid, myristoleic acid, palmitoleic acid, oleic acid, linoleic acid and/or linolenic acid and/or "konjuene" fatty acids, have proved to be particularly suitable. Fatty acids such as these may be used in the form of fatty acid mixtures obtainable from oils, preferably semi-drying or non-drying oils, such as palm kernel oil, palm oil, coconut oil, peanut oil, cottonseed oil, soybean oil, sunflower oil, linseed oil and rapeseed oil.

These alkyd resins suitable for water-containing stoving lacquers generally have a residual acid value below 25, as determined in accordance with DIN 53 402, the residual acid value including both free and neutralized residual acid groups.

The binder mixtures according to the invention may be prepared in various ways. In the most simple case, the poly-N-acyl alkyleneimines and the alkyd resins are first prepared independently of one another in known manner and then mixed together, if desired in the presence of an organic solvent. Any organic solvents known to the expert on lacquers may be used as the organic solvent, painter's naphtha, N-methyl pyrrolidone and/or ketones being particularly suitable. For stoving lacquers containing only organic solvents, the binder mixture may be directly dissolved in the organic solvents. If water-containing stoving lacquers are to be produced, the binder mixture may be emulsified in water, optionally after addition of an organic solvent. The organic solvent may be partly or completely removed by distillation after emulsification.

In a second variant of the process, the binder mixtures according to the invention may be prepared by carrying out the known cationic polymerization of the monomers corresponding to formulae (I), (II) and optionally (III) in the alkyd resin. In this case, it is advisable to heat the alkyd resins together with the monomers corresponding to formulae (I), (II) and optionally (III) to temperatures of 100° to 150° C. and then to add initiators to initiate the cationic polymerization, such as methyl tolsylate. If water-containing stoving lacquers are to be obtained, it is of advantage to add dicarboxylic acids and/or anhydrides thereof to the mixture on completion of the cationic polymerization in order to reintroduce acid groups by reaction of the hydroxyl groups of the alkyd resins with the dicarboxylic acids (anhydrides). Dicarboxylic acids (anhydrides) are preferably added in such a quantity that an acid value of 5 to 60 and preferably up to 25 is reached. The introduction of acid groups provides for better dispersibility of the binder mixture in water after at least partial neutralization with amines. On completion of the cationic polymerization or after the introduction of the acid groups, the binder mixture may be dissolved or emulsified in organic solvents or in water in the same way as described for the first variant of the process.

The binder mixtures according to the invention contain the alkyd resins in quantities of 10 to 90% by weight and preferably in quantities of 40 to 60% by weight and the poly-N-acyl alkyleneimines in quantities of 90 to 10% by weight and preferably in quantities of 60 to 40% by weight, based on binder mixture.

Although only alkyd resins and poly-N-acyl alkyleneimines are present in the binder mixture in accordance with the invention, it is still possible to add the other known binders where the lacquers have to meet certain requirements. Other known binders are nitrocellulose, polyacrylates, polyester resins, epoxy resins, modified alkyd resins, polyurethanes or chlorinated rubber.

Where the binder mixtures according to the invention are used for stoving lacquers, they are preferably converted into an emulsion or solution, as already described in reference to the preparation of the binder mixtures. The binder solids content (binder mixture) of these solutions or emulsions is generally between 30 and 50% by weight. In the most simple case, crosslinking agents are added to the solution or emulsion of the binder mixture obtained to prepare a lacquer. Suitable crosslinking agents for the alkyd resins contain methylol and/or blocked methylol groups and are well-known in the art and include phenol/formaldehyde condensates, urea/formaldehyde condensates, such as a urea/formaldehyde condensate containing methylol groups, melamine/formaldehyde condensates, such as a melamine/formaldehyde condensate containing methylol groups. The melamine/formaldehyde condensates containing methylol groups are particularly suitable as crosslinking agents for the binder mixtures.

If desired, however, typical constituents, such as plasticizers, pigments, siccatives and other auxiliaries and additives, may also be added. The quantities of solvent (water and/or organic solvents) and of the other lacquer ingredients lie within the limits typical of stoving lacquers.

High-quality lacquer films which are clear and which combine high hardness and gloss with high resistance to corrosion can be obtained with the binder mixtures according to the invention, even at stoving temperatures of only about 130° C. The films adhere to various substrates so that the lacquers may be used for coating metals, plastics and other materials. The lacquers are applied by standard methods.

The present invention also relates to processes for the production of the binder mixtures which are characterized in that a) the alkyd resins and poly-N-acyl alkyleneimines are prepared independently of one another in known manner and are subsequently mixed together or b) the monomers corresponding to formulae (I), (II) and optionally (III) are mixed with the alkyd resins and, after addition of polymerization initiators known per se, the polymerization of the monomers is carried out in known manner.

The present invention also relates to the use of the mixtures of alkyd resins and poly-N-acyl alkyleneimines of the described type as binder component in stoving lacquers. Further particulars of the other subjects of the invention can be found in the foregoing.

EXAMPLES

A) Production of the alkyd resin

In a three-necked flask equipped with a nitrogen inlet, reflux condenser and water separator, 281.0 g of a fatty acid mixture containing unsaturated fatty acids (composition in % by weight: 6 to 9 saturated $C_{14-18}$ carboxylic acid, 24 to 28 oleic acid, 3 to 9 linoleic acid and 58 to 62 of a mixture of conjugated unsaturated fatty acids containing 18 carbon atoms) were reacted while stirring with 51.5 g of trimethylol propane, 146.0 g of pentaerythritol and 224.0 g of p-butyl benzoic acid for 3 hours at 200° C. in the presence of 100 ml of xylene and 2.0 g of a tin-based esterification catalyst (Swedcat 3®, a product of Swedstab) During the reaction, 41 ml of water were removed as condensate. After cooling of the reaction mixture, another 146 g of pentaerythritol, 336 g of phthalic anhydride and 106 g of polyethylene glycol with an average molecular weight of 3,000 were added and the mixture was re-reacted for 6 hours at 180° to 200° C. 39 ml of water were separated as condensate. The reaction was terminated on reaching an acid value (DIN 53402) of 11.2 and, finally, the xylene was removed in vacuo.

B) Oxazolines

Ricinoloxazoline, phenyloxazoline, nonyloxazoline, soya-oxazoline and hydroxypentyloxazoline can be prepared from ethanol and corresponding carboxylic acids (mixtures) used in the form of their esters in accordance with DE-A-38 24 982, DE-A-39 14 155 and DE-A-39 14 133.

A mixture of 2-nonyl-2-oxazoline and 2-(1-hydroxymethylnonyl)-2-oxazoline was obtained by reacting 394.0 g of nonyloxazoline, corresponding to 2 moles, with 30.0 g of paraformaldehyde, corresponding to 1.0 mole, for 7 hours at 80° C.

C) Polymerization in the alkyd resin; Examples 1 to 5 and Comparison Examples 1 and 2

Quantities of 200 g of the alkyd resin according to A) were heated under nitrogen to 120° C. with quantities of 200 g of oxazolines with the composition shown in Table I. 1.75 g of methyl tolysate was added as initiator for the polymerization of the oxazolines. The reaction was carried out for 3 hours at 160° C. The reaction mixture was then cooled to 100° C., 15.8 g of phthalic anhydride were added to increase the acid value and the mixture was stirred for another 2 hours at 100° C. 1.0 g of triethylamine and 8.6 g of dimethyl ethanolamine were added to neutralize the acid groups. The resin obtained was dissolved with 171 g of methyl ethyl ketone.

525 g of distilled water were added to 500 g of the resin solution thus obtained and the methyl ethyl ketone was distilled off. 875 g of a 40% by weight emulsion, based on resin, were obtained.

TABLE 1

| Example | Oxazolines Oxazoline mixture of (in parts by weight P) |
|---|---|
| 1 | 60 P Ricinoloxazoline |
|   | 40 P Phenyloxazoline |
| 2 | 40 P Ricinoloxazoline |
|   | 60 P Phenyloxazoline |
| 3 | 60 P Mixture of nonyl and hydroxymethylnonyl-oxazoline acc. to B) |
|   | 40 P Phenyloxazoline |
| 4 | 40 P Mixture of nonyl and hydroxymethylnonyl-oxazoline acc. to B) |
|   | 20 P Nonyloxazoline |
|   | 40 P Phenyloxazoline |
| 5 | 40 P Nonyloxazoline |
|   | 20 P Hydroxypentyloxazoline |
|   | 40 P Phenyloxazoline |
| Comp. 1 | 60 P Soya-oxazoline |
|   | 40 P Phenyloxazoline |
| Comp. 2 | 60 P Nonyloxazoline |
|   | 40 P Phenyloxazoline |

D) Clear lacquers

Clear lacquers were produced from 50 g of the aqueous alkyd resin dispersions according to C), 0.5 g of dimethyl ethanolamine, 9.8 g of an 88% by weight solution of partly methylated melamine/formaldehyde resin (Cymel 370®, a product of Cyanamid) or 9.8 g of an 85% by weight solution of partly methylated melamine/formaldehyde resin (Cymel 373®, a product of Cyanamid) or 8.6 g of a partly methylated urea/formaldehyde resin (Cymel UFR 65®, a product of Cyanamid) and 4.0 g of water.

Clear lacquers with a solids content of 39 to 41% by weight were obtained. The lacquers were applied by knife coating (gap width 100 μ) to deep-drawn panels and stoved for 20 minutes at 130° C. The lacquers obtained were tested for hardness, elasticity and adhesion. Hardness was determined after 24 hours (König pendulum hardness, DIN 53157) and is expressed in seconds, the results obtained being better, the higher the values are. Elasticity and adhesion were measured by the Erichsen indentation method according to DIN ISO 1520. This measurement was also carried out after 24 hours, the results obtained being better, the higher the values are. The results obtained for the particular lacquers are set out in Table II.

TABLE II

| Lacquer of | Clear lacquers | | |
|---|---|---|---|
|  | Pendulum hardness secs. | Erichsen indentation mm | Appearance |
| Ex. 1 + Cymel 373 | 132 | 10 | Clear |
| Ex. 2 + Cymel 370 | 143 | 9.0 | Clear |
| Ex. 2 + Cymel 373 | 155 | 8.2 | Clear |
| Ex. 3 + Cymel 370 | 70 | 4.1 | Clear |
| Ex. 4 + Cymel 373 | 77 | 4.5 | Clear |
| Ex. 5 + Cymel 370 | 132 | 7.0 | Clear |
| Ex. 2 + Cymel UFR 65 | 143 | 8.9 | Clear |
| Comp. 1 + Cymel 373 | 135 | 6.8 | Cloudy |
| Comp. 2 + Cymel 373 | 88 | 2.5 | Cloudy |

E) White lacquers

A white lacquer was produced from 100 g of the aqueous alkyd resin dispersion of Example 2.

0.5 g of dimethyl ethanolamine, 19.5 g of partly methylated melamine/formaldehyde resin (Cymel 370®, a product of Cyanamid), 45.7 g of titanium dioxide (2056®, a product of Kronos), 13.8 g of water.

179.5 g of lacquer with a solids content of 57.5% by weight were obtained. The lacquer was knife-coated onto deep-drawn panels with a gap width of 100 μ as in D) and stoved for 20 minutes at 130° C. The lacquer-coated deep-drawn panels were tested for corrosion resistance by the salt spray test according to DIN 50 021.

The creepage of rust in mm after the salt spray test is shown in Table III. As Comparison 3, an aqueous dispersion was prepared from the starting alkyd resin according to A) by neutralization with dimethyl ethanolamine as in C) and a white lacquer was made up in accordance with the formulation of E) and was also tested for resistance to corrosion by the salt spray test.

TABLE III

| | White lacquer | | | | |
|---|---|---|---|---|---|
| | Rust creepage in mm after | | | | |
| Lacquer | 24 h | 48 h | 72 h | 96 h | 120 h |
| Ex. 2 + Cymel 370 | 0 | 0 | 0 | 1 | 1–2 |
| Comp. 1 + Cymel 370 | 0 | 1 | 2 | 3–4 | 4–6 |
| Comp. 3 | 0 | 1 | 2 | 3–4 | >5 |

It can be seen that resistance to corrosion is distinctly better in the case of the dispersion according to the invention than in the case of alkyd resins which are not modified with polyoxazoline (Comp. 3) or which are modified with oxazolines without any hydroxyl groups (Comp. 1).

We claim:

1. A stoving lacquer comprising

I) an effective quantity of a crosslinking agent containing methylol and/or blocked methylol groups; and II) an effective quantity of a binder mixture comprising A) at least one alkyd resin; and B) at least one poly-N-acyl alkyleneimine prepared by cationic polymerization of a monomer mixture of a) from 10 to 90% by weight of at least one monomer corresponding to formula (I):

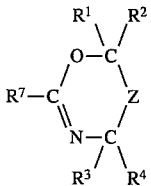

(I)

in which Z is a direct bond or the group $CR^5R^6$, $R^1$ to $R^4$ can be the same or different and represent H or a $C_{1-8}$ alkyl group, $R^5$ and $R^6$ can be the same or different and represent H or a $C_{1-2}$ alkyl group, $R^7$ is a hydroxyl-containing alkyl or alkylene group of a hydroxycarboxylic acid containing 2 to 32 carbon atoms, b) from 90 to 10% by weight of at least one monomer corresponding to formula (II):

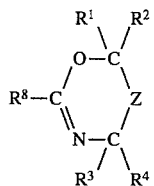

(II)

in which Z and $R^1$ to $R^6$ are as defined above and $R^8$ is the radical of an aromatic monocarboxylic acid, and c) from 0 to 80% by weight of at least one monomer corresponding to formula (III):

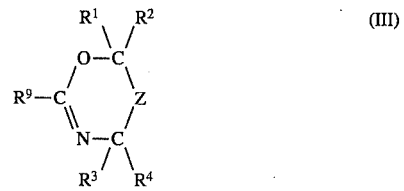

(III)

in which Z and $R^1$ to $R^6$ are as defined for formula (I), and $R^9$ represents a non-hydroxy-substituted aliphatic radical of a carboxylic acid wherein the above percentages by weight are based on the weight of the monomer mixture.

2. The stoving lacquer of claim 1 wherein component II) B) a) $R^7$ is a poly-N-acyl alkyleneimine prepared from monomers a) and b) in which Z is a direct bond and $R^1$ and $R^4$ are hydrogen in said monomers.

3. The stoving lacquer of claim 1 wherein in component II) B) a) $R^7$ is the alkyl or alkylene radical of a hydroxycarboxylic acid containing 4 to 22 carbon atoms.

4. The stoving lacquer of claim 3 wherein $R^7$ is the alkyl radical of hydroxyhexanoic acid or hydroxystearic acid and/or the alkylene radical of ricinoleic acid.

5. The stoving lacquer of claim 1 wherein in component II) B) the at least one poly-N-acyl alkyleneimine is prepared from a) 20 to 60% by weight of at least one monomer corresponding to formula (I) in which Z is a direct bond and $R^1$ to $R^4$ are hydrogen, b) 40 to 60% by weight of at least one monomer corresponding to formula (II) in which Z is a direct bond and $R^1$ to $R^4$ are hydrogen, and c) 0 to 40% by weight of at least one monomer corresponding to formula (III) in which Z is a direct bond, $R^1$ to $R^4$ are hydrogen and $R^9$ is the radical of a non-hydroxy-substituted aliphatic carboxylic acid containing 2 to 22 carbon atoms, wherein the above percentages by weight are based on the total weight of the monomers.

6. The stoving lacquer of claim 5 wherein component II) B) a) is ricinoloxazoline and/or hydroxypentyloxazoline, and component b) is phenyloxazoline.

7. The stoving lacquer of claim 1 wherein in component II), from 50 to 100 mol % of the residual acid groups present in component A) have been neutralized.

8. The stoving lacquer of claim 7 wherein said residual acid groups have been neutralized with ammonia and/or a volatile amine.

9. The stoving lacquer of claim 1 wherein component II) A) is at least one alkyd resin produced from a monobasic and a polybasic carboxylic acid and/or anhydrides thereof, and polyethylene glycol in a quantity of from 0.1 to 15% by weight based on alkyd-resin-forming reaction mixture.

10. The stoving lacquer of claim 1 wherein component II) A) is present in from 10 to 90% by weight and component B) is present in from 90 to 10% by weight, based on the binder mixture.

11. The stoving lacquer of claim 10 wherein component II) A) is present in from 40 to 60% by weight and component II) B) is present in from 60 to 40% by weight based on the binder mixture.

12. The stoving lacquer of claim 1 wherein in the at least one alkyd resin of component II) A) the hydroxyl value is in the range of from 20 to 200.

13. The stoving lacquer of claim 12 wherein said hydroxyl value is in the range of from 50 to 150.

14. The stoving lacquer of claim 1 wherein in component II) A) at least one alkyd resin has been produced from an unsaturated fatty acid.

15. A stoving lacquer of claim 1 wherein component II) is in the form of an emulsion or solution containing from 30 to 50% by weight of said binder mixture.

16. The stoving lacquer of claim 1 wherein component I) is selected from the group consisting of phenol/formaldehyde condensates, urea/formaldehyde condensates, and melamine/formaldehyde condensates.

17. The stoving lacquer of claim 1 wherein component I) is a urea/formaldehyde condensate containing methylol groups.

18. The stoving lacquer of claim 1 which also contains at least one of a solvent, plasticizer, pigment, or siccative.

* * * * *